US008856330B2

(12) United States Patent
Rangappan

(10) Patent No.: US 8,856,330 B2
(45) Date of Patent: Oct. 7, 2014

(54) SYSTEM FOR DETERMINING WHETHER TO BLOCK INTERNET ACCESS OF A PORTABLE SYSTEM BASED ON ITS CURRENT NETWORK CONFIGURATION

(71) Applicant: FMR LLC, Boston, MA (US)

(72) Inventor: Narayanan Rangappan, Bangalore (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 13/916,738

(22) Filed: Jun. 13, 2013

(65) Prior Publication Data

US 2014/0250222 A1   Sep. 4, 2014

Related U.S. Application Data

(60) Provisional application No. 61/772,029, filed on Mar. 4, 2013.

(51) Int. Cl.
G06F 15/173 (2006.01)
H04L 12/26 (2006.01)
H04L 12/28 (2006.01)

(52) U.S. Cl.
CPC ............ *H04L 43/00* (2013.01); *H04L 12/2856* (2013.01); *H04L 12/2854* (2013.01); *H04L 12/2872* (2013.01)
USPC ............................ 709/225; 709/224; 709/223

(58) Field of Classification Search
CPC ... H04L 12/248; H04L 12/28; H04L 12/2801; H04L 12/2818; H04L 12/2825; H04L 12/2856; H04L 12/2827; H04L 12/2829; H04L 12/287; H04L 12/2872; H04L 12/2876; H04L 12/40104; H04L 12/4011; H04L 12/46; H04L 29/0621; H04L 29/06319; H04L 29/06326; H04L 29/06632; H04L 29/06823; H04L 29/06829; H04L 29/06836; H04L 29/06843; H04L 29/0685; H04L 29/06986; H04L 29/08099; H04L 12/2854
USPC ................. 709/223, 224, 225, 221, 238, 217; 455/411; 726/30, 3; 370/331
See application file for complete search history.

(56) References Cited

U.S. PATENT DOCUMENTS

| | | | |
|---|---|---|---|
| 6,044,402 | A | 3/2000 | Jacobson et al. |
| 6,166,688 | A | 12/2000 | Cromer et al. |
| 6,850,943 | B2 | 2/2005 | Teixeira et al. |
| 7,248,563 | B2 | 7/2007 | Bhogal et al. |
| 7,409,482 | B2 | 8/2008 | Olsen et al. |
| 7,448,076 | B2 | 11/2008 | Ocepek et al. |
| 7,725,936 | B2 | 5/2010 | Banerjee et al. |

(Continued)

FOREIGN PATENT DOCUMENTS

| | | |
|---|---|---|
| CN | 102045361 A | 5/2011 |
| JP | 2002269041 A | 9/2002 |
| WO | 2011072719 A1 | 6/2011 |

*Primary Examiner* — Le H Luu
(74) *Attorney, Agent, or Firm* — Gesmer Updegrove LLP

(57) ABSTRACT

A system for monitoring a portable system external to an enterprise network is provided that includes a network monitoring system that monitors any changes to the network configuration of the portable system. If a change is detected the network monitoring system determines if the portable system is not currently connected to the enterprise network and has access to Internet so as to block access to the Internet until the portable system is properly connected to the enterprise network. An event logger receives notification from the network monitoring system and logs the status as to whether the portable system has Internet access.

15 Claims, 3 Drawing Sheets

(56) References Cited

U.S. PATENT DOCUMENTS

| | | |
|---|---|---|
| 7,814,543 B2 | 10/2010 | Phillips et al. |
| 2006/0075506 A1 | 4/2006 | Sanda et al. |
| 2007/0011725 A1 | 1/2007 | Sahay et al. |
| 2007/0214242 A1 | 9/2007 | Watanabe et al. |
| 2008/0104688 A1 | 5/2008 | Paskett et al. |
| 2009/0131020 A1* | 5/2009 | van de Groenendaal ..... 455/411 |
| 2010/0043066 A1 | 2/2010 | Miliefsky |
| 2011/0231534 A1* | 9/2011 | Manring et al. ............... 709/221 |
| 2012/0017009 A1* | 1/2012 | Short et al. ..................... 709/238 |
| 2012/0030731 A1 | 2/2012 | Bhargava et al. |
| 2012/0069747 A1 | 3/2012 | Wang et al. |
| 2012/0072985 A1 | 3/2012 | Davne et al. |
| 2012/0166582 A1* | 6/2012 | Binder .......................... 709/217 |
| 2013/0104251 A1* | 4/2013 | Moore et al. .................... 726/30 |
| 2013/0136102 A1* | 5/2013 | Macwan et al. ............... 370/331 |
| 2013/0198805 A1* | 8/2013 | Strebe ............................... 726/3 |

* cited by examiner

SYSTEM FOR DETERMINING WHETHER TO BLOCK INTERNET ACCESS OF A PORTABLE SYSTEM BASED ON ITS CURRENT NETWORK CONFIGURATION

PRIORITY INFORMATION

This application claims priority from provisional application Ser. No. 61/772,029 filed Mar. 4, 2013, which is incorporated herein by reference in its entirety.

BACKGROUND OF THE INVENTION

The invention is related to the field of computer security, and in particular to a system that compels an approved external asset to connect to a network through VPN when off-site.

Computer network security is typically of paramount importance to network operators to ensure that only authorized users are able to access network resources such as services, applications, files, data, and the like.

In many networks, the number of users authorized to access different network resources may run from a single user up to multiple millions of users.

Over time, some users may have their authorization or entitlement to access network resources withdrawn, for example when an employee leaves a company, and new users may be authorized to access network resources, for example when a person starts employment with a company. Different users may also have authorization to access different network resources within a network.

The details of which users are entitled to access which network resources are typically distributed around the network at various end-points. End-points may include, for example, directories, data stores, databases, applications, and devices within the network and are used by security systems protecting network resources to control access to those resources.

The end-points are typically provisioned with user details of the users authorized to access different network resources. An initial provisioning step is performed using one or more user data sets provided from various network systems (not shown), for example, such as human resources databases, customer databases, and the like. User details may include, for example, user identifiers, passwords, user email addresses, user telephone numbers, and other user-related data.

However, such an approach becomes complex and unwieldy to manage when the number of users is large.

SUMMARY OF THE INVENTION

According to one aspect of the invention, there is provided a system for monitoring a portable system external to an enterprise network. The system includes a network monitoring system that monitors any changes to the network configuration of the portable system. If a change is detected the network monitoring system determines if the portable system is not currently connected to the enterprise network and has access to Internet so as to block access to the Internet until the portable system is properly connected to the enterprise network. An event logger receives notification from the network monitoring system and logs the status as to whether the portable system has Internet access.

According to another aspect of the invention, there is provided a method of monitoring a portable system external to an enterprise network. The method includes monitoring any changes to the network configuration of the portable system using a network monitoring system. If a change is detected the network monitoring system determines if the portable system is not currently connected to the enterprise server and has access to Internet to block access to the Internet until the portable system is properly connected to the enterprise server. Also, the method includes receiving notification from the network monitoring system the status as to whether the portable system has Internet access and logs that information for later retrieval using an event logger.

According to another aspect of the invention, there is provided a computer-readable storage medium containing thereon a computer program for monitoring a portable system external to an enterprise network. The computer program is monitoring any changes to the network configuration of the portable system using a network monitoring system. If a change is detected the network monitoring system determines if the portable system is not currently connected to the enterprise server and has access to Internet to block access to the Internet until the portable system is properly connected to the enterprise server. Also, the computer program includes receiving notification from the network monitoring system the status as to whether the portable system has Internet access and logs that information for later retrieval using an event logger.

DETAILED DESCRIPTION OF THE INVENTION

The invention involves a network monitoring system designed to protect an enterprise network from being accessed by a portable system, such as a laptop, smartphone, tablet, or computer system, that is external the enterprise network without first accessing VPN. These portable systems have the ability to connect to any Internet site before connecting to the enterprise's VPN. Which means, they can access any website like Google™, Yahoo.com™ or the like. However it puts the organization at greater risk of getting infected by malware, key loggers, and can intentionally/un-intentionally share confidential information that are stored in the portable systems, which could be sensitive information like customer data, SSN Numbers and the like.

To protect the organization, customer data, other important assets, and provide a safe working environment, the invention blocks all traffic IN and OUT of a portable system after the portable system connects to the Internet. The portable system can resume its normal mode once it is connected to the enterprise network by way of VPN. This solution helps maintain one control point for all maintenance purposes and provides a safe and seamless experience of working off-site.

Figure 1:
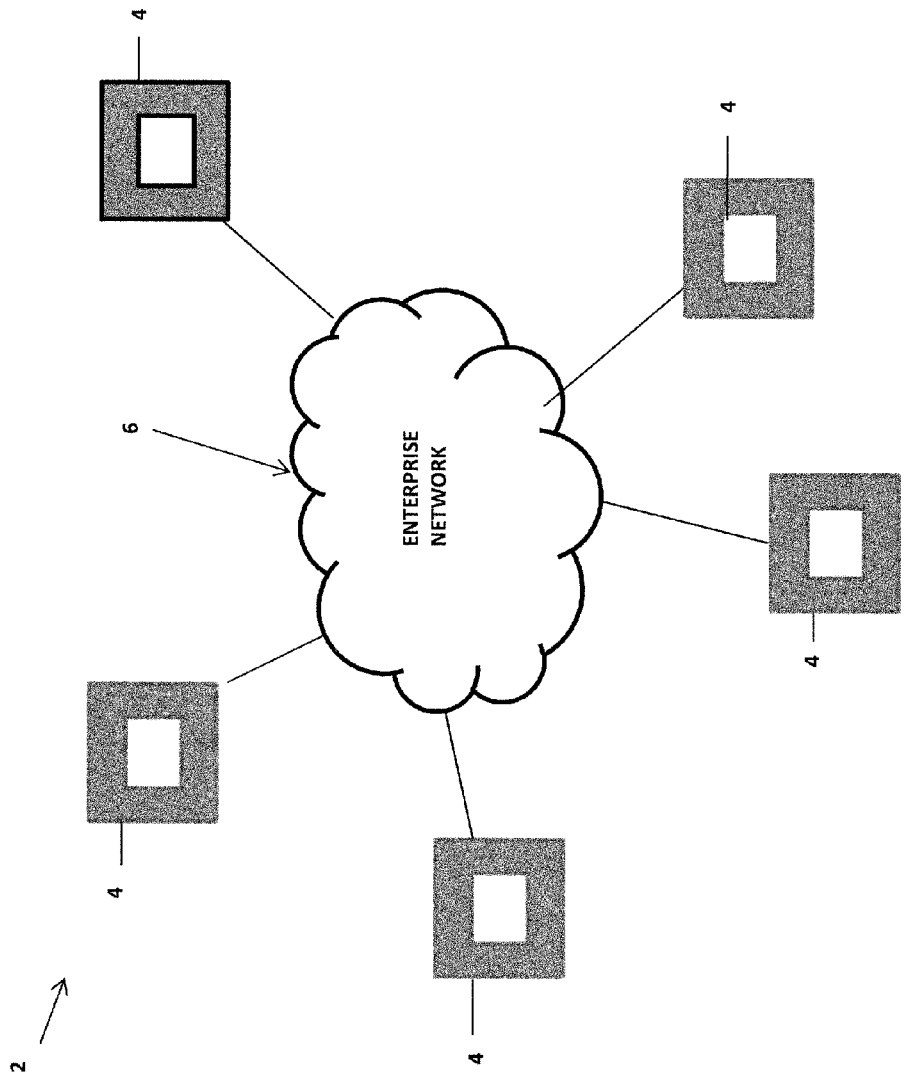
FIG. 1 shows a general architecture environment used in accordance with the invention.

FIG. 1 shows a general architecture environment 2 used in accordance with the invention. The network monitoring system is installed on a portable system 4, such as a laptop, or computer system. The portable system 4 is one of a plurality of devices that are connected to the enterprise network 6 via VPN. The network monitoring system is installed on each portable system 4 and monitors and detects changes that have occurred in the portable device's network 4 configuration. If a change in the network configuration is detected, the network monitoring system sets itself in active mode. Under specific conditions, users cannot have the ability to browse the Internet through any available means from the portable system 4. Moreover, the network monitoring system logs all activities to an event log and maintains a white list of websites which remain open for browsing under all conditions. In addition, the network monitoring system allows all browsing requests to the enterprise network to be unblocked.

Moreover, enterprise-based access must never be blocked. Techline and Regional support tools should always be granted access as well as the Internet Service Provider (ISP) page.

Figure 2:
FIG. 2 is a schematic diagram illustrating a table demonstrating state conditions under which the web access must be blocked.

FIG. 2 illustrates a table 10 demonstrating state conditions under which the web access must be blocked. The table 10 indicates when there is Internet connectivity and the portable system is connected with the enterprise network, web access is enabled. Moreover, if there is Internet connectivity but the portable system is not connected to the enterprise network, web access is disabled and all traffic other than those whitelisted will be blocked. When there is no Internet connection and the portable system is not connected to the enterprise, web access is not blocked because there is no traffic. Furthermore, if there is no Internet connectivity then there is no enterprise connection, as indicated in the table this option is not permissible as a state.

Figure 3:
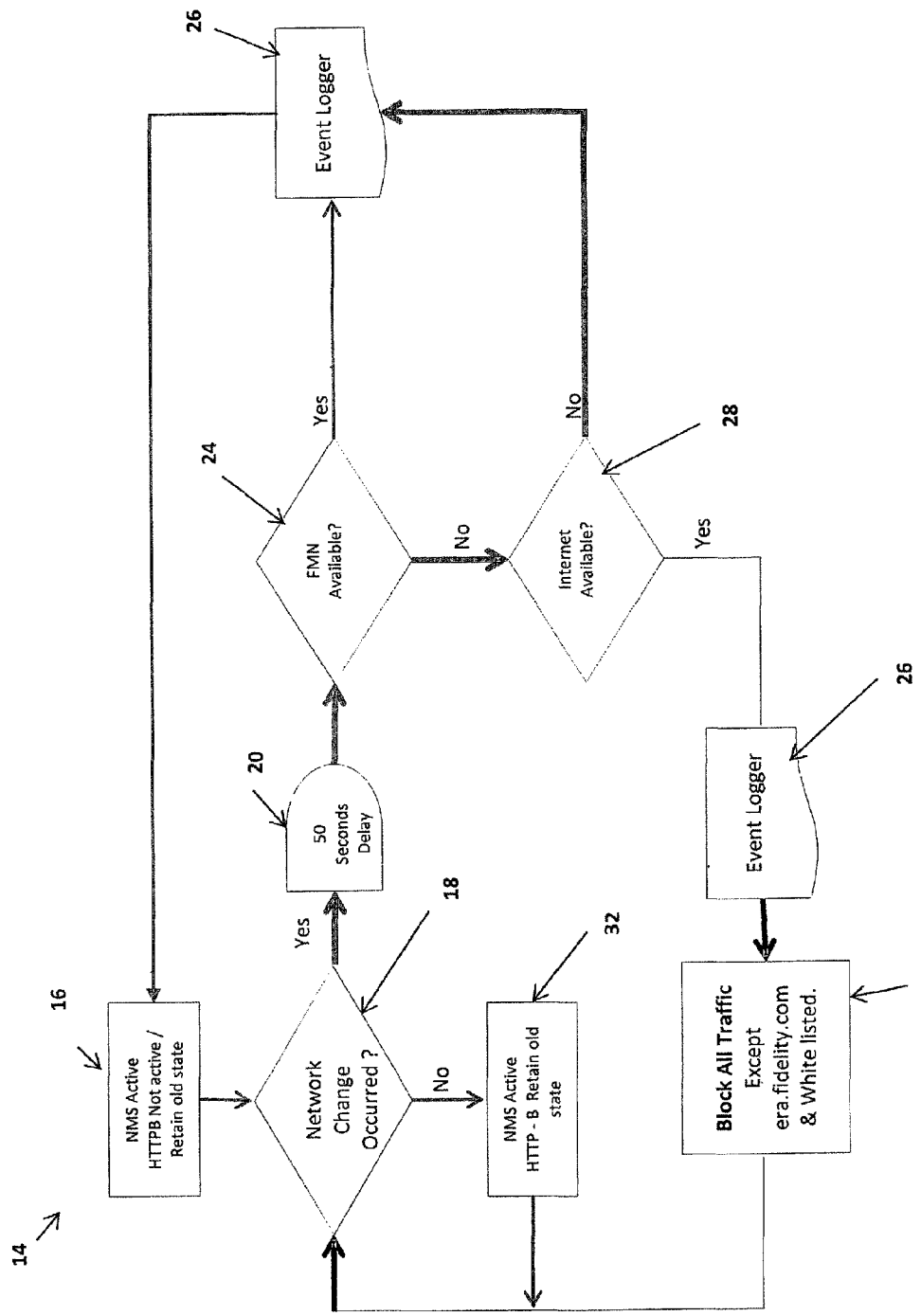
FIG. 3 is a schematic diagram illustrating a process flow of the invention.

FIG. 3 is a schematic diagram illustrating a process flow 14 of the invention. In this case, it is assumed the portable system includes a properly installed version of the code executing the invention. The network monitoring service is activated automatically by an event logger 26 when a request to access the enterprise server is received, as shown in step 16. The network monitor system detects if are any changes in the network configuration, as shown in step 18. If detected, the network monitor system issues a 50 second delay shown in step 20 and determines if connectivity is needed with the enterprise, as shown in step 24. If the enterprise is available, the event is logged in the event logger 26 otherwise the network monitoring system checks if Internet is available, as shown in step 28. Once it is determined that the internet is not available the event is logged in the event logger 26. If the Internet is available the HTTP blocker used by invention is initiated all traffic other than whitelisted will be blocked, as shown in step 30. It will stay that way until there is a change in the network configuration, as shown in step 32.

The following scenarios can cause a change in the network configuration: (1) moving from Wired to Wireless connection and vice versa; (2) hibernating laptop in FMN connection and resuming in outside; (3) hibernating laptop in Outside network connection and resuming in FMN; (4) connecting and disconnecting from VPN; (5) connecting through 3G Card, connecting through LAN Cable; (6) connecting through Routers configured outside of the network; (7) connecting through an ISP who has authentication mechanism; (8) connecting from Hotel; or (9) connecting from Airport.

The invention is platform independent and can execute in any operating system platform, such as Windows® or Macintosh®. The invention can also be written in any platform independent-based computer language, such as Java or the like. The invention executes on a portable system having a processor or the like. The invention can be stored in the RAM or ROM of the portable system Furthermore, the invention can be stored on an external memory device to be uploaded to the portable system for execution.

Although the present invention has been shown and described with respect to several preferred embodiments thereof, various changes, omissions and additions to the form and detail thereof, may be made therein, without departing from the spirit and scope of the invention.

What is claimed is:

1. A system for monitoring a portable system external to an enterprise network comprising:

a network monitoring system that monitors any changes to the network configuration of the portable system, if a change is detected the network monitoring system determines if the portable system is not currently connected to the enterprise network and has access to Internet so as to block access to the Internet until the portable system is properly connected to the enterprise network, the network monitoring system executing within the portable device, the network monitoring system monitors and detects changes that have occurred in the network configuration of the portable system, wherein upon detection of a change, a user is prevented from browsing the internet from the portable system unless certain conditions are met, if the portable system is connected to the Internet and not connected to the enterprise network, access to the Internet is disabled and all traffic other than those deemed acceptable is blocked as defined by a whitelist; and an event logger that receives notification from the network monitoring system and logs the status as to whether the portable system has Internet access.

2. The system of claim 1, wherein the network monitoring system checks if the portable system is Internet accessible and connected to enterprise network allowing the portable system access to the Internet.

3. The system of claim 1, wherein the network monitoring system is in active mode once a network configuration change has been detected.

4. The system of claim 1, wherein the network monitoring system determines if the portable system is Internet accessible and not connected to the enterprise network denying the portable system access to the Internet.

5. The system of claim 1, wherein the network monitoring system determines if the portable system is not Internet accessible and not connected to the enterprise network and not blocking the portable system access to the Internet.

6. A method of monitoring a portable system external to an enterprise network comprising:

monitoring any changes to the network configuration of the portable system using a network monitoring system, if a change is detected the network monitoring system determines if the portable system is not currently connected to the enterprise network and has access to Internet to block access to the Internet until the portable system is properly connected to the enterprise network, the network monitoring system executing within the portable device, the network monitoring system monitors and detects changes that have occurred in the network configuration of the portable system, wherein upon detection of a change, a user is prevented from browsing the Internet from the portable system unless certain conditions are met, if the portable system is connected to the Internet and not connected to the enterprise network, access to the Internet is disabled and all traffic other than those deemed acceptable is blocked as defined by a whitelist; and receiving notification from the network monitoring system the status as to whether the portable system has Internet access and logs that information for later retrieval using an event logger.

7. The method of claim 6, wherein the network monitoring system checks if the portable system is Internet accessible and connected to enterprise network allowing the portable system access to the Internet.

8. The method of claim 6, wherein the network monitoring system determines if the portable system is Internet accessible and connected to the enterprise network allowing the portable system access to the Internet.

9. The method of claim 6, wherein the network monitoring system is in active mode once a network configuration has been detected.

10. The method of claim 6, wherein the network monitoring system determines if the portable system is not Internet accessible and not connected to the enterprise network and not blocking the portable system access to the Internet.

11. A non-transitory computer-readable storage medium containing thereon a computer program for monitoring a portable system external to an enterprise network, said computer program comprising:

monitoring any changes to the network configuration of the portable system using a network monitoring system, if a change is detected the network monitoring system determines if the portable system is not currently connected to the enterprise server and has access to Internet to block access to the Internet until the portable system is properly connected to the enterprise server, the network monitoring system executing within the portable device, the network monitoring system monitors and detects changes that have occurred in the network configuration of the portable system, wherein upon detection of a change, a user is prevented from browsing the interne from the portable system unless certain conditions are met, if the portable system is connected to the Internet and not connected to the enterprise network, access to the Internet is disabled and all traffic other than those deemed acceptable is blocked as defined by a whitelist; and receiving notification from the network monitoring system the status as to whether the portable system has Internet access and logs that information for later retrieval using an event logger.

12. The non-transitory computer-readable storage medium of claim 11, wherein the network monitoring system checks if the portable system is Internet accessible and connected to the enterprise network allowing the portable system access to the Internet.

13. The non-transitory computer-readable storage medium of claim 11, wherein the network monitoring system is in active mode once a network configuration has been detected.

14. The non-transitory computer-readable storage medium of claim 11, wherein the network monitoring system determines if the portable system is Internet accessible and not connected to the enterprise network denying the portable system access to the Internet 15. The non-transitory computer-readable storage medium of claim 11, wherein the network monitoring system determines if the portable system is not Internet accessible and not connected to the enterprise network so as to not block the portable system access to the Internet.

* * * * *